United States Patent [19]
Chitrapu et al.

[11] Patent Number: 5,442,694
[45] Date of Patent: Aug. 15, 1995

[54] RING TONE DETECTION FOR A TELEPHONE SYSTEM

[75] Inventors: Prabhakar Chitrapu, Princeton; Zhibing Pan, Randolph; Chet Juall, Warren; Andrew Dumont, Lk. Hopatcong, all of N.J.

[73] Assignee: Dialogic Corporation, Parsippany, N.J.

[21] Appl. No.: 226,678

[22] Filed: Apr. 12, 1994

[51] Int. Cl.$^6$ ............................................. H04M 1/00
[52] U.S. Cl. ............................. 379/373; 379/386; 379/372; 379/377
[58] Field of Search ................ 379/386, 373, 372, 377

[56] References Cited
U.S. PATENT DOCUMENTS

| | | | |
|---|---|---|---|
| 4,815,136 | 3/1989 | Benvenuto | 379/351 |
| 5,109,409 | 4/1992 | Bomgardner et al. | 379/386 |

*Primary Examiner*—James L. Dwyer
*Assistant Examiner*—Jacques M. Saint-Surin
*Attorney, Agent, or Firm*—Kaplan and Mugno

[57] ABSTRACT

A technique for software ring tone detection is disclosed utilizing, in the preferred embodiment, a recursive algorithm. The technique provides flexibility in that a digital signal processor may be reprogrammed to detect ring tone frequencies and amplitudes present in numerous different countries.

20 Claims, 2 Drawing Sheets

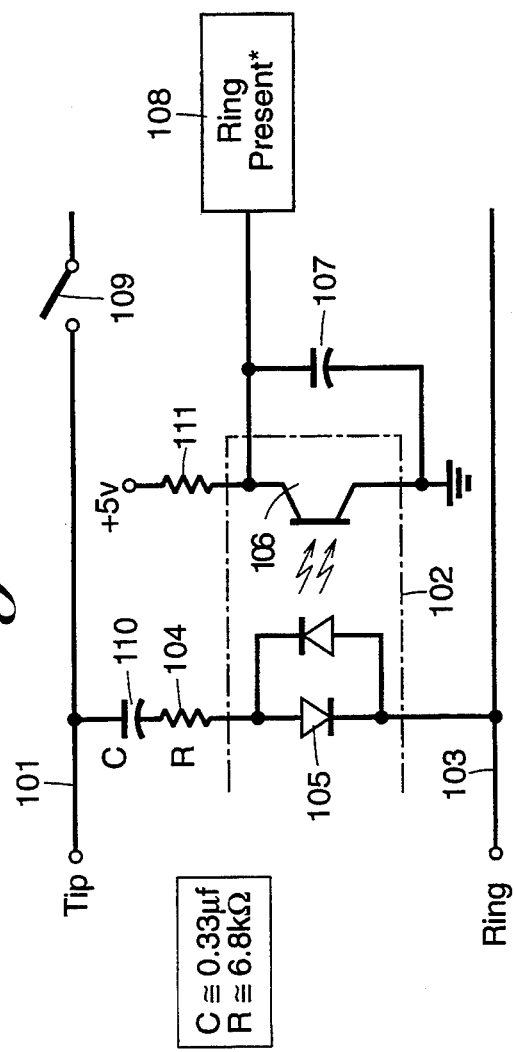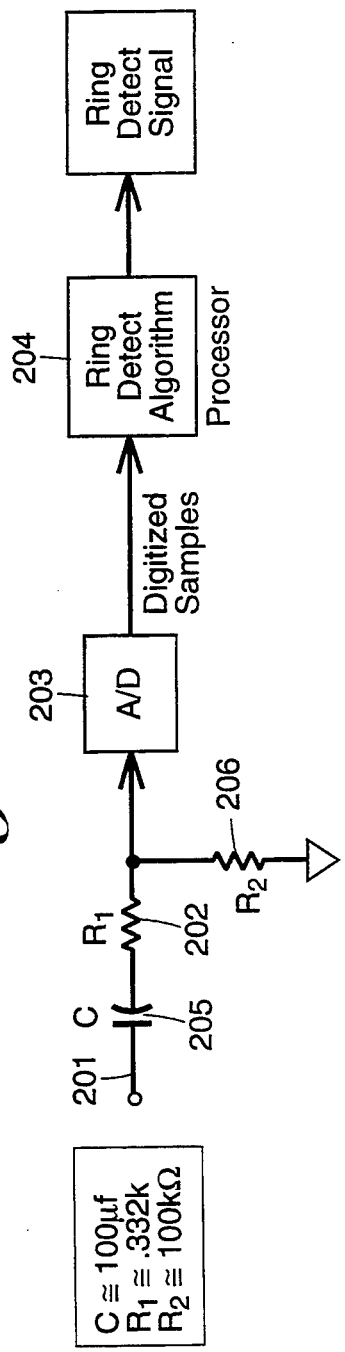

RING TONE DETECTION FOR A TELEPHONE SYSTEM

TECHNICAL FIELD

The present invention relates to telephony, and more specifically, to an improved ring tone detection technique for allowing detection of relatively low ring tone frequencies.

BACKGROUND OF THE INVENTION

Standard telephone networks utilize a plurality of signalling tones at various frequencies in order to implement control and supervisory functions, status messages, etc. For example, the well known "busy" signal is a repeating tone comprised of two particular frequencies. Similarly, the signal sent to the calling party when a called party's telephone is ringing is called "ringback".

The signal which is transmitted from the central office switch to the telephone in order to cause the telephone to ring is termed "ring tone". Ring tone is defined differently from country to country but is usually a relatively low frequency tone at a relatively high voltage. For example, in Germany, the specification for ring tone requires that a telephone detect tones anywhere between 23 and 54 Hz with a value of at least 30 volts rms while simultaneously rejecting frequencies in the range of 23 through 54 Hz having a value no greater than 22 volts rms. Additionally, the equipment must be capable of rejecting frequencies under 18 Hz and over 64 Hz if the amplitude of such signals is 75 volts rms or less. Finally, timing and cadence requirements dictate that detection occur within 200 ms.

In the United States, the ring tone specification requires that telephone equipment must be capable of rejecting signals no greater than 3 volts rms and of detecting, as valid ring tone, signals from 15–68 Hz at 40 volts rms or better.

Generally, tones of various frequencies may be detected through the use of digital signal processing. However, it is relatively difficult to detect these ring tones in software due to the following reasons. First the amplitude is much greater than that of normal tones received (e.g.; DTMF) through the telephone system. For example, the ring tone may be an AC signal of between 65 and 130 volts. In addition, in the United States, the ring tone includes a negative DC component, typically 48 volts, but which may run as much as 70 volts. Moreover, some countries require that in the worst case, the circuit must be capable of detecting the ring tone within half a cycle or less, making conventional digital signal processing algorithms unacceptable.

In some systems, signals from the telephone line are not passed to the system's digital signal processor until the equipment goes off hook. However, in systems which include Automatic Number Identification (ANI), signals from the telephone line are typically passed through a high pass filter and then fed to the digital signal processor, even when the telephone equipment is on hook. In these "on-hook filtered" systems, any signal below 300 Hz, including the ring tone signal, is greatly attenuated prior to the digital signal processor.

As a result of the above stringent requirements and resulting problems, ring tone detection is typically done through a hardware arrangement. One such ring detect circuit is described in the article "A Musical Telephone Bell" by Steve Ciarcia in *Byte* Magazine, July 1984. As described at page 128 of the Ciarcia article, the incoming signal is passed through a capacitor and on to a telephone bell, causing the bell to ring.

With the recent advent of voice processing systems, it has become prevalent to build computer equipment which is connected to the telephone line and which simulates a telephone handset. In such a case, the ring detect circuitry is built into a circuit board of the type typically installed into a personal computer or other type of circuit board rack. The problem with prior art ring detection techniques is that they are implemented in hardware and therefore can only be constructed to detect the ring tone signal in a particular country's telephone system. Thus, a manufacturer of such equipment must make numerous versions of its circuit card to ensure compatibility with telephone systems in various countries.

Moreover, in countries such as Germany, where stringent frequency requirements are present, it is difficult to ensure proper performance over the full range of operating conditions. More particularly, since the response of hardware analog components varies with temperature, humidity, etc., it is difficult to meet specifications under all conditions.

It is also noted that opto-isolation is required in these prior systems. Opto-isolation is utilized to ensure that the high ring voltage is not passed through to a user of the equipment.

As a still further problem, hardware components used for ring detection, such as diodes, optical detectors, etc., must be built onto the circuit boards used in voice processing applications, thereby occupying valuable space and increasing cost. Moreover, all of the hardware components are subject to failure, thereby decreasing reliability.

In view of the above, it can be appreciated that there exists a need in the art for a configurable ring detector that will occupy minimal circuit card space, while being capable of rapidly and reliably detecting very low frequency ring tones from the telephone line, which ring tones may be at different frequencies.

SUMMARY OF THE INVENTION

The above and other problems of the prior art are solved in accordance with the present invention which relates to an improved estimation apparatus for detecting ring tones by estimating the frequency of an incoming signal after analog-to-digital (A/D) conversion. In accordance with the present invention, the ring tone signal is attenuated by a filter, and then processed and detected digitally.

In a preferred embodiment, a filter, amplifier, and digital-to-analog converter which are already present in the system for implementing Automatic Number Identification (ANI) are utilized for detection of ring-tone signals.

Several algorithms are disclosed for implementing the invention, two of which are recursive and quite amenable to a rapid implementation.

BRIEF DESCRIPTION OF THE DRAWINGS

FIG. 1 is a conceptual block diagram of a prior art ring tone detection arrangement;

FIG. 2 depicts a high level block diagram of a ring detect apparatus in accordance with the present invention;

DETAILED DESCRIPTION OF THE PREFERRED EMBODIMENT

Figure 3:
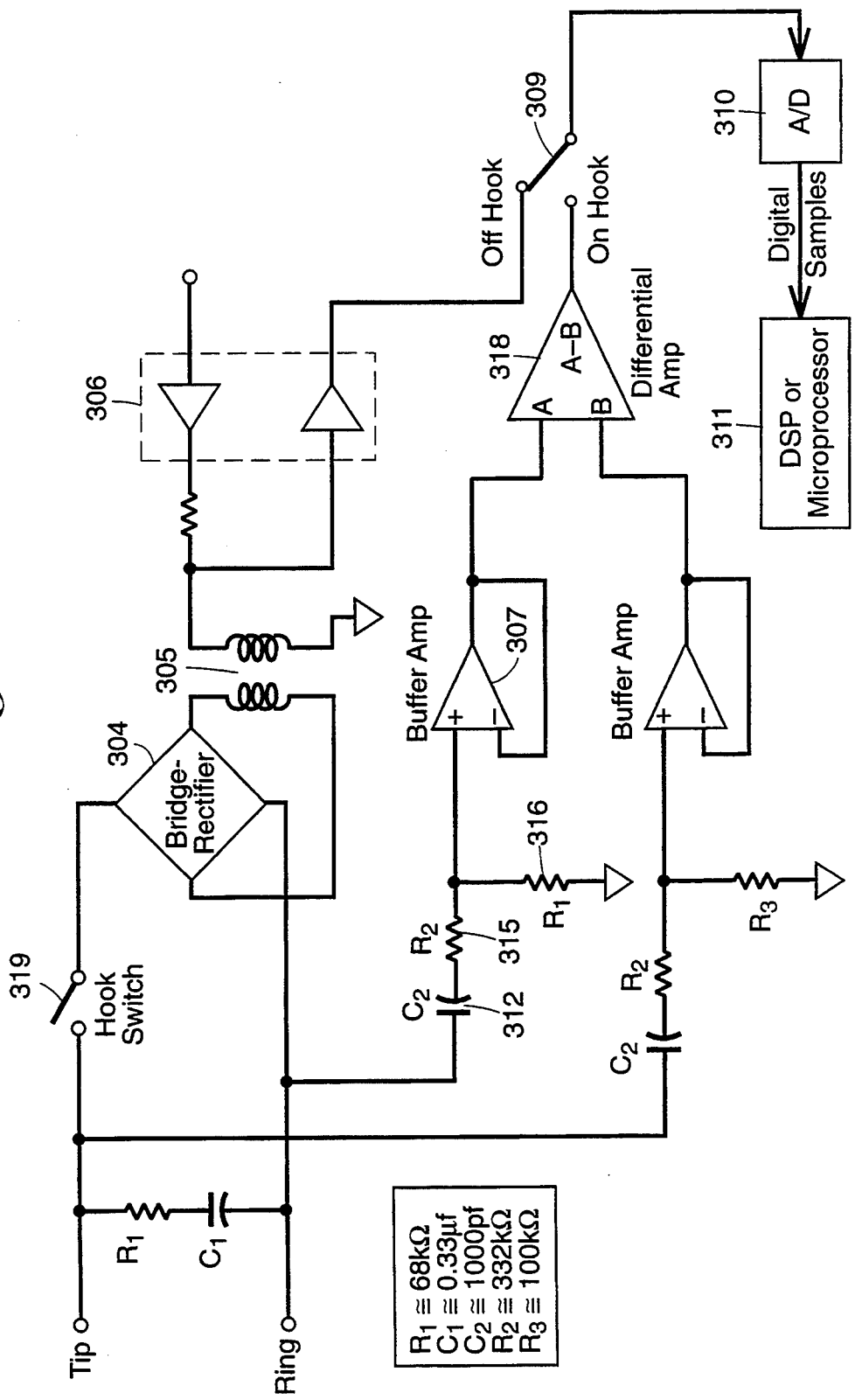
FIG. 3 is an additional preferred embodiment of the invention incorporated into a telephone circuit which includes Automatic Number Identification (ANI).

FIG. 1 shows a prior art ring tone detection apparatus. The arrangement of FIG. 1 includes an opto-coupler 102 which provides isolation of the relatively high ring tone voltage from the remainder of the telephone circuit. The circuit of FIG. 1 may be implemented in either a digital telephone apparatus or a voice processing equipment.

In operation, a ring tone signal is presented by the network (not shown) between tip terminal 101 and ring terminal 103. The signal passes through high impedance 104, a typical value of which is 10k ohms, and causes light emitting diode (LED) 105 to become active.

Capacitor 110 serves to provide DC isolation. Light from LED 105 turns on transistor 106, thereby pulling RING PRESENT signal 108 low through resister 111. Capacitor 107 serves to prevent high frequencies from being passed to the ringing circuit. Switch 109 closes when the phone is off hook, thereby providing a communications path between the telephone and the network.

FIG. 2 shows a conceptual block diagram of the basic components of one embodiment of the present invention. The ring signal is received from the telephone network (not shown) via line 201 and passes through filtering capacitor 205. A typical value of filtering capacitor 205 is one nanofarad. The capacitor 205 is shunted to ground via resistors 202 and 206, preferably 332k and 100k ohms, respectively.

Analog-to-Digital (A/D) convertor 203 digitizes the attenuated ring tone signal and transmits the digital samples to a ring detect algorithm 204. The ring detect algorithm may be a software module in a central processing unit (CPU), or may be implemented on a specialized digital signal processor in either the telephone equipment or the voice processing hardware as the case may be.

Resistors 202 and 206, and capacitor 205, serve as a filter with a frequency response chosen to greatly attenuate the ring tone signal. Thus, no opto-isolation of the ring tone signal is required. Rather, the attenuation to the ring tone signal, caused by capacitor 205 and resistor 202, is sufficient to bring the amplitude of the ring tone signal within safe limits, and further, within the dynamic range of A/D converter 203. Therefore, the attenuation is utilized as an advantage rather than a drawback.

FIG. 3 shows an alternative embodiment of the present invention wherein a user voice terminal having preexisting ANI functions may be utilized in order to provide ring tone detection in software. As is well known in the art, a bridge 304 and transformer 305 work in conjunction with amplifier 306 to transmit analog signals to, and receive analog signals from, the telephone network.

In operation, signals received from the telephone line are filtered through capacitors 312 and resistors 315 and 316. A differential amplifier 318 transmits the buffered signals to switch 309. When the phone is on hook, switch 309 causes the signals, which include ANI data, to be transmitted to A/D converter 310 and to be detected and processed by digital signal processor 311.

In accordance with the present invention, it is noted that the ring tone is transmitted to the digital signal processor 311 for processing as well. (The ANI data, which falls within the passband of the filter, is not attenuated). The attenuated ring tone signal is converted to digital format by A/D converter 310 and then processed by digital signal processor 311.

When the voice processing system is off hook, DSP 311 is utilized to process signals within the voice band of the telephone network (e.g.; DTMF tones, voice, etc). When switches 309 and 319 are in the on hook position, DSP 311 processes both signals within the voice band (e.g.; ANI) and signals outside the voice band of the network (e.g.; ring tone).

The arrangement of FIG. 3 is particularly advantageous in that the ring tone detection may be done by digital signal processor 311, which is already present for the purpose of ANI processing. Only the software needs to be modified to detect ring tones. Additionally, since filtering capacitors 312 and amplifiers 307 and 318 are present for ANI processing also, no additional hardware is required for ring tone detection.

Due to the stringent requirements for ring tone detection discussed previously, conventional signal processing algorithms may be unsatisfactory. Therefore, several novel algorithms which may be implemented by digital signal processor 311 are set forth below.

One technique is to model the ring tone as the output of a linear time invariant oscillatory system of degree 2, contaminated by additive noise. When we construct the difference equation for such a system, we define a quantity e(n), where n is the sampling index, e(n) is the modeling error, which, due to the noise in the system, is not zero. We therefore estimate this value e(n) and minimize its average power, thereby making it as close to zero as possible. We will set forth two possible estimates, and the minimizations thereof.

One estimate J of the average power of e(n) is defined as:

$$[1/n]\ [\Sigma e^2(i)]$$

where the sum runs from 0 to n−1, n being the total number of samples used for the estimate. Based on this estimate of e(n), it can be shown that the angular frequency $2\pi f$ of the signal being sampled can be computed as follows:

$$[\cos(2\pi f)]_n = Num(n)/Den(n)$$

where $$Num(n) = [\Sigma \{x(i) + x(i-2)\} x(i-1)]/2n$$

and $$Den(n) = [\Sigma x^2(i-1)]/n$$

Where both summations run from 0 to n−1.

The above algorithm can estimate the frequency of a typical ring tone signal of 13–70 Hz (e.g.; it can detect ring tone) reliably in less than half a cycle. We also note that the estimate at any sample time (n) of the frequency of the incoming signal depends upon all of the samples from sample zero through n−1. Such an arrangement lends itself nicely to a recursive type of computational algorithm which allows a record of the frequency estimates of the incoming tone at different times, while also greatly reducing the number of calculations required to estimate the frequency at any time. A recursive technique for calculating the numerator is as follows:

$$Num(n+1) = (n/n+1)[Num(n)] + (1/(2n+2))[x(n)+x(n-2)][x(n-1)]$$

The denominator at time sample n+1 is calculated as follows:

$$Den(n+1) = (n/n+1)[Den(n)] + [x^2(n-1)]/(n+1)$$

and the frequency estimate is:

$$[\cos(2\pi f)]_{n+1} = Num(n+1)/Den(n+1).$$

As can be seen from the above equation, if the numerator and the denominator are known at any given sample time, the numerator and denominator at the next given sample can be calculated quickly, and with minimal processing power.

The basic concept of the above technique is to calculate autocorrelation function estimates of the incoming signal at different time lags. For example, the denominator is an expression for the estimate of the autocorrelation function at time 0. The numerator is an expression for the autocorrelation function at time lag 1 and at time lag −1. We note that both the numerator and the denominator are divided by n so that they can be calculated independently without divergence.

Having defined the basic algorithm for estimating low frequency tones, we turn now to a few extensions thereof. For example, rather than weight all samples between zero and n−1 equally, one can build in a "forgetting factor", an exponential factor in both the numerator and the denominator which decays so that the samples are weighted less and less as they become more remote in time from the present sample. Thus, a sample 8 sample times ago will count less in the calculation than a sample 7 sample times ago, etc.

Such an arrangement can be implemented as:

$$[\cos(2\pi f)]_n = \Sigma \frac{\lambda^{n-i-1} x(i-1)\{x(i) + x(i-2)\}}{\Sigma \lambda^{n-i-1} x^2(i-1)}$$

Where $[\cos(2\pi f)]_n$ denotes the estimate of cosine ($2\pi f$) based on n samples, and where the summations are both from 0 to n−1, (i) is the summation index, and where ($\lambda$), the forgetting factor, preferably is in the range from 0.93 to 0.98.

The preferred technique is to calculate the numerator and denominator in a recursive fashion, as follows:

$$Num(n+1) = (1-\lambda)Num(n) + \tfrac{1}{2}\lambda(x(n)+x(n-2))x(n-1)$$

$$Den(n+1) = (1-\lambda)Den(n) + \lambda x^2(n-1)$$

and $$[\cos(2\pi f)]_{n+1} = Num(n+1)/Den(n+1)$$

Another such extension involves using a window of M samples rather than all prior samples. The window embodiment can be calculated as follows, allowing both summations to run from n−M+1 through n:

$$[\cos(2\pi f)]_n = \frac{\Sigma\{x(i) + x(i-2)\}x(i-1)}{\Sigma x^2(i-1)}$$

Where the summation runs from 0 to n−1. The above algorithm can detect typical ring tones in as little as a quarter of a cycle. In one preferred embodiment, a 20 Hz ring tone signal may be detected with values of M ranging from 100–200.

The invention has the key advantage that the ring detection algorithm may be implemented after the ring detect signal passes through the high pass filter with a low frequency cut-off of approximately 300 Hz. Thus, in systems with ANI, this filtering is already implemented.

It is also noted that the ring tone signal is passed through an amplifier prior to detection. Additionally, by reprogramming the algorithm to simply trigger based upon the particular frequencies being searched for, the algorithm is flexible and adaptable.

It is also noted that after calculating the frequency, it may be desirable to check the energy of the signal before concluding that ring tone is present. An equation for estimating the energy of the incoming signal is $$E(n) = (1-\lambda)E(n-1) + (\lambda)x^2(n)$$

Where n is the timing index, $\lambda$ is a constant (e.g.; 0.9), E(n) is the present estimate, and $x^2(n)$ is the square of the present sample. Those of ordinary skill in the art will know the proper threshold to which E(n) should be compared, which threshold also depends upon the expected signal characteristics.

While the above describes the preferred embodiment of the invention, it will be apparent to those of the ordinary skill in the art that other embodiments are possible. Such additions and/or modifications are intended to be covered by the following claims.

We claim:

1. A method of detecting a ring tone signal in a telephone apparatus receiving an input signal from a remote caller, said telephone apparatus comprising a transformer having a first side for interfacing with a telephone network and a second side for interfacing with a voice processing apparatus the method comprising the steps of:

attenuating the input signal being received at the first side of the transformer from a telephone network while said voice processing apparatus is on-hook;
   digitizing said attenuated signal;
   processing said digitized signal in a processor having an input to determine whether said ring tone is present or not; and
   switching the input of the processor to receive a signal from the second side of said transformer after said voice processing apparatus goes off-hook.

2. The method of claim 1 wherein said step of attenuating comprises the step of transmitting the signal through a high pass filter.

3. A method of processing signals received from a telephone network, having a voice band at a telephone apparatus said telephone apparatus having at least an on-hook state and an off-hook state comprising the steps of:

inputting, while said apparatus is on-hook, said received signals into a digital signal processor;

digitally processing said signals from a first side of a transformer to detect information transmitted outside the voice band of the telephone network while said apparatus is on-hook;

switching said apparatus to an off-hook state; and digitally processing, in the processing means, said signals from a second side of the transformer to detect information within the voice band Of the telephone network after said step of switching.

4. A method of digitally estimating the frequency of a signal received from a telephone networks, said signal having an auto-correlation function, a frequency, and a period, and of activating a ring tone detect logic circuit, the method comprising the steps of:

digitally calculating the auto-correlation function of said received signal at multiple time lags to obtain a numerator;

digitally calculating the auto-correlation function of said received signal at a single time lag to obtain a denominator;

dividing the numerator by the denominator to obtain a result;

obtaining an estimate of said frequency, from said result, after no more than one half of said period; and asserting a logic signal to a predetermined state if said frequency estimate is within a predetermined range to thereby activate said logic circuit.

5. The method of claim 4 wherein said numerator and said denominator are calculated respectively as the following summations:

$$Num(n) = [\Sigma\{x(i)+x(i-2)\}x(i-1)]/2n$$

and $$Den(n) = [\Sigma x^2(i-1)]/n$$

both of said summations running from i=0 to n−1.

6. The method of claim 4 wherein said numerator and said denominator are calculated as the following summations:

$$Num(n) = \Sigma \lambda^{n-i-1} x(i-1) \{x(i)+x(i-2)\}$$

and $$Den(n) = \Sigma \lambda^{n-1-1} x^2(i-1)$$

both of said summations running from i=0 to n−1.

7. The method of claim 4, wherein said numerator and said denominator are calculated as the following summations:

$$Num(n) = \Sigma\{x(i)+x(i-2)\}x(i-1)$$

and $$Den(n) = \Sigma x^2(i-1)$$

both of said summations running from i=n−M+1 to n, 1≦M≦n.

8. The method of claim 4 further comprising the step of calculating the inverse cosine of said result.

9. Apparatus for detecting ring tone in a telephone network having a voice bandwidth said apparatus comprising:

filter means having a passband and arranged to receive said ring tone from said telephone network, said filter means being arranged such that said ring tone is outside said passband;

an analog to digital (A/D) convertor having an input and an output and being connected to the output of said filter means for digitizing said filtered ring tone signal;

a digital signal processor coupled to said output of said A/D convertor for digitally processing samples output by said A/D convertor and for detecting when ring tone is present; and means for detecting whether said apparatus is in an on hook or off hook state, and for connecting the input of said A/D convertor to a different electrical point based upon said on hook or off hook state.

10. The apparatus of claim 9 wherein said digital signal processor also detects signals other than ring tone.

11. Apparatus of claim 10 wherein said digital signal processor includes:

means for calculating the autocorrelation function of said ring tone signal at predetermined time lags.

12. Apparatus of claim 11 wherein said digital signal processor includes:

means for detecting signals within the voiceband of the telephone network; and means for detecting signals outside of said bandwidth of said telephone network.

13. Apparatus of claim 9 wherein said digital signal processor calculates the following summations:

$$Num(n) = [\Sigma\{x(i)+x(i-2)\}x(i-1)]/2n$$

and $$Den(n) = [\Sigma x^2(i-1)]/n$$

both of said summations running from i=0 to n−1.

14. Apparatus of claim 9 wherein said digital signal processor calculates the following summations:

$$Num(n) = \Sigma \lambda^{n-i-1} x(i-1) \{x(i)+x(i-2)\}$$

and $$Den(n) = \Sigma \lambda^{n-i-1} x^2(i-1)$$

both of said summations running from i=0 to n−1.

15. Apparatus of claim 9 wherein said digital signal processor calculates the following summations:

$$Num(n) = \Sigma\{x(i)+x(i-2)\}x(i-1)$$

and $$Den(n) = \Sigma x^2(i-1)$$

both of said summations running from i=n−M+1 to n, 1≦M≦n.

16. Apparatus of claim 13 wherein said digital signal processor is programmed to calculate said summations in a recursive manner.

17. Apparatus of claim 14 Wherein said digital signal processor is programmed to calculate said summations in a recursive manner.

18. Apparatus of claim 15 wherein said digital signal processor is programmed to calculate said summations in a recursive manner.

19. Apparatus for detecting ring tones in a telephone signal being received from a remote user, said apparatus comprising:

processing means for detecting ring tone signals and for performing voice processing during a telephone call; and switching means for switching the input to the processing means from either a first electrical point or a second electrical point.

20. Apparatus for detecting ring tone in a telephone network having a voice bandwidth said apparatus comprising:

filter means having a passband and arranged to receive said ring tone from said telephone network, said filter means being arranged such that said ring tone is outside said passband;

an analog to digital (A/D) convertor having an input and an output and being connected to the output of said filter means for digitizing said filtered ring tone signal;

a digital signal processor coupled to said output of said A/D convertor for digitally processing samples output by said A/D convertor and for detecting when ring tone is present; and means for detecting whether said apparatus is in an on hook or off hook state, and for connecting the input of said A/D convertor to process information either inside or outside the voice bandwidth based upon said on hook or off hook state.

* * * * *